US012522473B2

(12) United States Patent
Guilani et al.

(10) Patent No.: US 12,522,473 B2
(45) Date of Patent: Jan. 13, 2026

(54) ELEVATOR LOAD BEARING MEMBER WITH CONDUCTIVE ADHESIVE

(71) Applicant: OTIS ELEVATOR COMPANY, Farmington, CT (US)

(72) Inventors: Brad Guilani, Woodstock Valley, CT (US); Ricardo Brown, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 600 days.

(21) Appl. No.: 17/902,409

(22) Filed: Sep. 2, 2022

(65) Prior Publication Data

US 2024/0076164 A1 Mar. 7, 2024

(51) Int. Cl.

| | |
|---|---|
| ***B66B 11/00*** | (2006.01) |
| ***B66B 5/00*** | (2006.01) |
| ***B66B 7/06*** | (2006.01) |
| ***C09J 9/02*** | (2006.01) |
| ***D07B 1/06*** | (2006.01) |
| ***D07B 1/14*** | (2006.01) |
| ***D07B 1/16*** | (2006.01) |

(52) U.S. Cl.

CPC ............ *B66B 11/0065* (2013.01); *B66B 7/06* (2013.01); *D07B 1/145* (2013.01); *D07B 1/162* (2013.01); *B66B 5/0018* (2013.01); *C09J 9/02* (2013.01); *C09J 2301/408* (2020.08); *D07B 1/0613* (2013.01); *D07B 2201/2012* (2013.01); *D07B 2301/45* (2013.01); *D07B 2501/2007* (2013.01)

(58) Field of Classification Search

CPC ...... D07B 1/06; D07B 1/0666; D07B 1/0646; D07B 2501/2007; D07B 1/145; B66B 11/0065; B66B 5/0018; C09J 9/02; C09J 11/04

See application file for complete search history.

(56) References Cited

U.S. PATENT DOCUMENTS

| | | | | |
|---|---|---|---|---|
| 2007/0190315 | A1 | 8/2007 | Vanbrabant | |
| 2008/0136551 | A1* | 6/2008 | Phillips | H01F 17/0006 174/128.1 |
| 2011/0142744 | A1* | 6/2011 | Feng | B82Y 40/00 977/843 |
| 2011/0259677 | A1* | 10/2011 | Dudde | D07B 5/006 187/411 |

(Continued)

FOREIGN PATENT DOCUMENTS

| | | |
|---|---|---|
| IN | 4133/DELNP/2006 | 8/2007 |

OTHER PUBLICATIONS

Biron, Michel. (2018). Thermoplastics and Thermoplastic Composites (3rd Edition).*

(Continued)

*Primary Examiner* — Jennifer A Gillett

(74) *Attorney, Agent, or Firm* — Carlson, Gaskey & Olds, P.C.

(57) ABSTRACT

An elevator load bearing member includes a plurality of load bearing wires, a polymer-based conductive adhesive coating on each of the plurality of the wires, and a jacket surrounding the wires. The jacket is adhered to the wires by the polymer-based conductive adhesive coating. A method of making a load bearing member for an elevator system is also disclosed.

11 Claims, 1 Drawing Sheet

(56) References Cited

U.S. PATENT DOCUMENTS

| | | | | |
|---|---|---|---|---|
| 2014/0130350 | A1* | 5/2014 | Raymond | G01M 3/165<br>29/887 |
| 2015/0307321 | A1* | 10/2015 | Breite | B66B 7/06<br>187/254 |
| 2017/0260427 | A1* | 9/2017 | Dickel | C08K 3/08 |
| 2019/0168999 | A1* | 6/2019 | Guilani | G01N 27/20 |
| 2019/0277544 | A1* | 9/2019 | Lakshmanan | B60N 2/58 |

OTHER PUBLICATIONS

Samal, Prasan K. Newkirk, Joseph W.. (2015). ASM Handbook, vol. 07—Powder Metallurgy (2015). ASM International.*

* cited by examiner

ELEVATOR LOAD BEARING MEMBER WITH CONDUCTIVE ADHESIVE

BACKGROUND

A variety of elevator systems are known. Some elevator systems use a hydraulic arrangement for moving the elevator car. Others are traction-based and include roping that suspends the elevator car and a counterweight. A machine causes movement of a traction sheave that, in turn, causes movement of the roping for moving the elevator car as desired.

Advancements have been made in monitoring systems for monitoring the health of the elevator system. Some of these health monitoring systems utilize the roping, which is more generally a load-bearing member of the elevator system. Even with the advancement, those skilled in the art have been striving to improve elevator load bearing member technology.

SUMMARY

An elevator load bearing member according to an exemplary embodiment of this disclosure, among other possible things includes a plurality of load bearing wires, a polymer-based conductive adhesive coating on each of the plurality of the wires, and a jacket surrounding the wires. The jacket is adhered to the wires by the polymer-based conductive adhesive coating.

In a further example of the foregoing, the polymer-based conductive adhesive comprises an intrinsically conductive polymer.

In a further example of any of the foregoing, the intrinsically conductive polymer includes at least one of polyacetylene (PA), polyaniline (PAni), polypyrrole (PPy), polythiophere(PTh),poly(3,4-ethylene-dioxythiophene), PEDOT, and poly(phenylvinylene) (PPV).

In a further example of any of the foregoing, the intrinsically conductive polymer is functionalized to facilitate the adhesion of the jacket to the wires.

In a further example of any of the foregoing, the polymer-based conductive adhesive includes a non-conductive polymer adhesive and a conductive element.

In a further example of any of the foregoing, the conductive element includes at least one of carbon nanotubes, graphene, and metal powder.

In a further example of any of the foregoing, the nonconductive polymer adhesive includes at least one of an epoxy, a urethane, or an acrylate.

In a further example of any of the foregoing, the polymer-based conductive element comprises less than about 5% by weight of the conductive element.

In a further example of any of the foregoing, the conductive element comprises between about 0.5% and about 1% by weight of the polymer-based conductive adhesive.

In a further example of any of the foregoing, an electrical conductivity of the polymer-based conductive adhesive is at least about 10 siemens.

In a further example of any of the foregoing, the plurality of load bearing wires are steel wires.

A method of making a load bearing member for an elevator system according to an exemplary embodiment of this disclosure, among other possible things includes applying a polymer-based conductive adhesive coating onto a plurality of wires such that the polymer-based conductive adhesive facilitates electrical conduction between the wires, and surrounding the plurality of wires with a jacket, wherein the jacket is adhered to the wires by the polymer-based conductive adhesive.

In a further example of the foregoing, the polymer-based conductive adhesive comprises an intrinsically conductive polymer.

In a further example of any of the foregoing, the method also includes functionalizing the intrinsically conductive polymer to facilitate the adhesion of the jacket to the wires.

In a further example of any of the foregoing, the polymer-based conductive adhesive includes a non-conductive polymer adhesive and a conductive element.

In a further example of any of the foregoing, the conductive element includes at least one of carbon nanotubes, graphene, and metal powder.

In a further example of any of the foregoing, the polymer-based conductive element comprises less than about 5% by weight of the conductive element.

In a further example of any of the foregoing, the conductive element comprises between about 0.5% and about 1% by weight of the polymer-based conductive adhesive.

In a further example of any of the foregoing, an electrical conductivity of the polymer-based conductive adhesive is at least about 10 siemens.

In a further example of any of the foregoing, the plurality of wires are steel wires.

DETAILED DESCRIPTION

Figure 1:
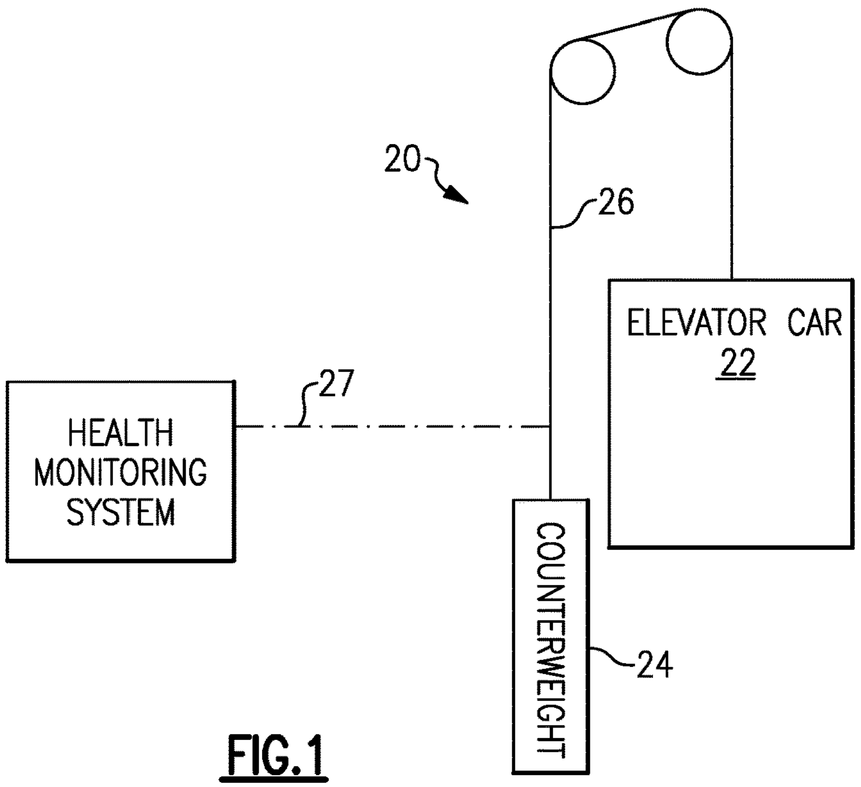
FIG. 1 schematically illustrates selected portions of an elevator system including a load bearing member designed according to an embodiment of this invention.

FIG. 1 schematically shows selected portions of an elevator system 20. An elevator car 22 and counterweight 24 are suspended by a load bearing member 26. A traction sheave associated with a machine (not specifically illustrated) selectively controls movement of the load bearing member 26 to control the movement or position of the elevator car 22. For illustration purposes, a single load bearing member 26 is represented in FIG. 1. Multiple load bearing members would be included in many embodiments.

Figure 2:
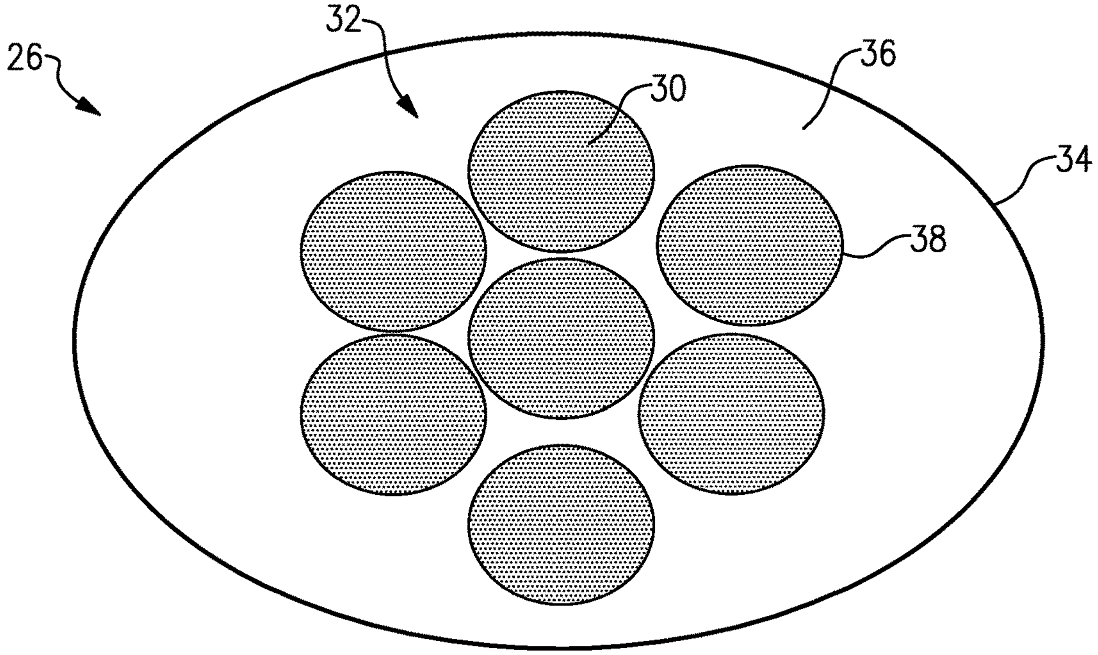
FIG. 2 schematically illustrates an example embodiment of an elevator load bearing member.

FIG. 2 schematically illustrates an example load bearing member 26 including a plurality of load bearing wires 30 arranged in a bundle 32. The wires 30 may be wrapped or twisted around one another within the bundle 32. Though one bundle 32 is shown in FIG. 2, it should be understood that multiple bundles 32 could be used within the load bearing member 26. The bundles may be wrapped or twisted around one another to form one or more cords. The wires 30 may comprise a variety of materials that are useful for supporting the loads of the elevator system 20, such as steel or aluminum and alloys thereof. The bundle 32 is surrounded by a jacket 34.

The jacket 34 includes an inner portion or layer 36 that is received against the cords 30. The inner portion 36 comprises a compressible material such as polyurethane, polyamide, polyester, or ethylene propylene diene monomer rubber (EPDM), or combinations thereof.

With continued reference to FIG. 1, the elevator system also includes a health monitoring system 27, schematically shown in FIG. 1. The health monitoring system 27 monitors the health of the load bearing member 26. Such health monitoring systems are known in the art, but in general, the wires 30 in the load-bearing member 26 form a circuit. The health monitoring system 27 compares a resistance measured within the circuit to an expected resistance for the circuit. If there is a discrepancy between the measured and expected resistance, it could indicate a fault in the load bearing member 26.

Each of the wires 30 include a conductive adhesive coating 38. The conductive adhesive coating 38 adheres the wires 30 to one another and to the inner layer 36 of the jacket 34. Adequate adhesion is particularly important between the wires 30 and the jacket 34 to maintain the integrity of the load-bearing member 26 and prevent the wires 30 from debonding and/or pulling out from the jacket 34 and maintain the required tensile strength for the loadbearing member 26.

The conductive adhesive coating 38 also facilitates formation of the circuit discussed above for the health monitoring system 27. In other words, the conductive adhesive coating 38 facilitates electrical conduction between the individual wires 30. In general, the conductive adhesive coating 38 has an electrical conductivity of at least 10 siemens.

The conductive adhesive coating 38 may also provide corrosion protection to the wires 30, in some examples.

The conductive adhesive coating 38 is a polymer-based adhesive coating with a conductive element. In one example, the conductive adhesive coating 38 comprises a polymer that is intrinsically conductive, such as polyacetylene (PA), polyaniline (PAni), polypyrrole (PPy), polythiophere (PTh), poly(3,4-ethylene-dioxythiophene), PEDOT, or poly(phenylvinylene) (PPV). That is, the intrinsically conductive polymer is itself the conductive element in this example. The intrinsically conductive polymer can be applied to the wires 30 by any suitable method such as painting, spraying, dipping, etc.

In some examples, the intrinsically conductive polymer is functionalized according to any known method to improve its adhesive properties.

In another example the conductive adhesive coating 38 is polymeric composite material that includes a non-conductive polymeric adhesive and a conductive element. Polymer composites are well known in the art and the composite can be made by any suitable method of combining the non-conductive polymeric adhesive with the conductive element. Any known non-conductive polymeric adhesive such as epoxies, urethanes, or acrylates could be used. Likewise, any suitable conductive elements, such as carbon nanotubes, graphene, or metal powder could be used. In a particular example, the polymeric composite material comprises less than about 5% by weight of the conductive element. In a more particular example the polymeric composite material comprises between about 0.5% and about 1% by weight of the conductive element. In this way, the mechanical and adhesive properties of the conductive adhesive coating 38 are substantially the same as the properties of the non-conductive polymer adhesive. In other words, the addition of the conductive element does not substantially change the mechanical and adhesive properties of the non-conductive polymer adhesive.

As used herein, the term "about" has the typical meaning in the art, however in a particular example "about" can mean deviations of up to 10% of the values described herein.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator comprising:

a load bearing member;

an elevator car;

one or more sheaves;

a counter weight associated with the load bearing member such that the elevator car and the counterweight are suspended by the loading bearing member via the one or more sheaves;

wherein the load bearing member comprises:

a plurality of load bearing wires arranged in a bundle;

a polymer-based conductive adhesive coating on each of the plurality of load bearing wires; and a jacket surrounding the plurality of load bearing wires, wherein the jacket is adhered to the plurality of load bearing wires by the polymer-based conductive adhesive coating; and wherein the polymer-based conductive adhesive coating either comprises an intrinsically conductive polymer or comprises a non-conductive polymer adhesive and less than about 5% by weight of a conductive element.

2. The elevator of claim 1, wherein the intrinsically conductive polymer includes one or more of polyacetylene (PA), polyaniline (PAni), polypyrrole (PPy), polythiophene (PTh), poly (3,4-ethylene-dioxythiophene) (PEDOT), and poly (phenylvinylene) (PPV).

3. The elevator of claim 1, wherein the intrinsically conductive polymer is functionalized to facilitate adhesion of the jacket to the plurality of load bearing wires.

4. The elevator of claim 1, wherein the conductive element includes one or more of carbon nanotubes, graphene, and metal powder.

5. The elevator of claim 1, wherein the non-conductive polymer adhesive includes at least one of an epoxy, a urethane, or an acrylate.

6. The elevator of claim 1, wherein the conductive element comprises between about 0.5% and about 1% by weight of the polymer-based conductive adhesive coating that is comprised of the non-conductive polymer adhesive and the conductive element.

7. The elevator of claim 1, wherein an electrical conductivity of the polymer-based conductive adhesive coating is at least 10 siemens.

8. The elevator of claim 1, wherein the plurality of load bearing wires are steel wires.

9. The elevator of claim 1, wherein the load bearing member has one end associated with the elevator car and an opposite end associated with a counterweight.

10. The elevator of claim 1, wherein the plurality of load bearing wires are wrapped or twisted around one another within the bundle.

11. The elevator of claim 10, wherein the plurality of load bearing wires are comprised of steel or aluminum or alloys thereof.

* * * * *